Dec. 12, 1961 T. LJUNGSTROM 3,012,443
MECHANICAL MOVEMENT FOR TRANSLATING
ROTARY MOTION TO LINEAR MOTION
Original Filed Jan. 11, 1960
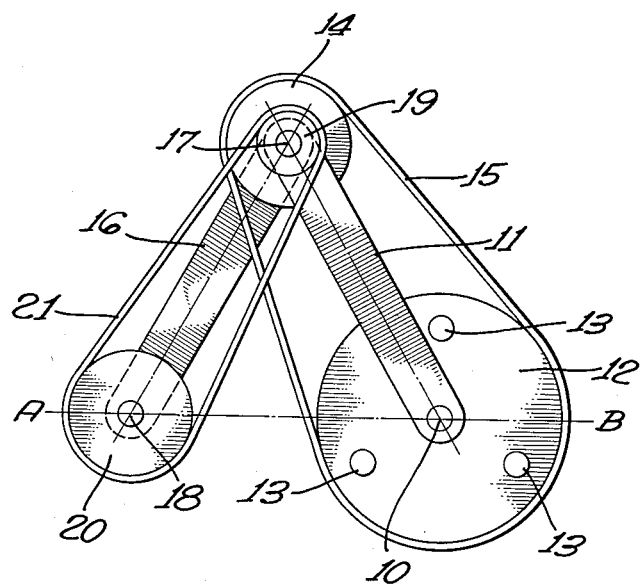
TORSTEN LJUNGSTROM
INVENTOR.
BY Hazard & Miller
ATTORNEYS.

United States Patent Office 3,012,443
Patented Dec. 12, 1961

3,012,443
MECHANICAL MOVEMENT FOR TRANSLATING ROTARY MOTION TO LINEAR MOTION
Torsten Ljungstrom, Sollentuna, Sweden, assignor to Patent Management, Inc., Minneapolis, Minn., a corporation of Minnesota
Original application Jan. 11, 1960, Ser. No. 1,601. Divided and this application Jan. 29, 1960, Ser. No. 5,400
2 Claims. (Cl. 74—89)

This invention relates to a mechanical movement for translating rotary motion into linear motion or vice versa. The application may be considered as a division of the subject matter disclosed in my copending application filed collaterally herewith, Serial No. 1,601, filed January 11, 1960, and now abandoned.

In my copending application I have disclosed a mechanism wherein a first arm is rotatable or swingable about an axis of rotation in accordance with any triggering or exciting force. This arm has rotatably mounted near the outer end thereof an arcuate member which rollingly engages a stationary arcuate member whose radius of curvature is twice that of the radius of curvature of the arcuate member that is rotatably mounted on the arm. The stationary arcuate member is concentrically arranged with respect to the axis of rotation of the arm. If the arcuate member that is rotatably mounted on the arm carries or has rigid therewith a second arm carrying a stylus that is spaced from the axis of rotation of the arcuate member on the arm a distance that said axis of rotation of the arcuate member relative to the arm is spaced from the axis of rotation of the arm itself, the stylus will be moved in a straight line commensurate with the magnitude of the swing of the first-mentioned arm about the axis of rotation.

I have also demonstrated mathematically in said application why this occurs when the above-described relationship exists.

In the present application I disclose an embodiment employing the same general principle but which may be regarded as having been somewhat simplified and rendered easier of construction and application.

I also disclose herein how a structure mounted at the stylus end of the second arm can be caused to move linearly without turning.

With the foregoing and other objects in view, which will be made manifest in the following detailed description and specifically pointed out in the appended claims, reference is had to the accompanying drawing for an illustrative embodiment of the invention, wherein:

The drawing is a diagrammatic view illustrating the present invention.

Referring to the accompanying drawing wherein similar reference characters designate similar parts throughout, 10 indicates a primary axis of rotation, such as for example a shaft that can be triggered or excited by any triggering or exciting force and whose movement it is desired to translate into linear motion. A first arm 11 is swingable about the axis of rotation 10 and may be in the form of a simple crank arm that is rigidly fastened to or keyed to the shaft that is rotatable about the axis 10.

An arcuate member 12 is concentrically arranged with respect to the axis 10 and is held stationary, such as by rivets, bolts, or the equivalent indicated at 13. On the outer end of the first arm 11 there is rotatably mounted a second arcuate member 14 whose diameter is one-half of that of the arcuate member 12. An endless member 15 which may be in the form of a chain, belt, or band partially encircles both arcuate members 12 and 14 so as to engage the arcuate or peripheral surfaces thereof without slipping. To insure against slipping the two arcuate members 12 and 14 may be in the form of sprockets and the endless member 15 may be in the form of a chain. In the alternative the two arcuate members may be in the form of pulleys and the endless member 15 may be in the form of a non-slip belt trained thereover. The purpose in either alternative is to cause the arcuate member 14 to turn relative to the first arm 11 at the same peripheral speed as that at which the first arm 11 travels along the periphery of the arcuate member 12 in the course of its being swung by the exciting rotary force imparted to it on the axis 10.

A second arm 16 is rigid with the second arcuate member 14 and is swingable thereby about the axis 17 which represents the axis on the first arm 11 that the second arcuate member 14 is rotatable about. Point 18 on the free end of the second arm 16 is spaced from the axis 17 a distance equal to the distance that axis 17 is spaced from axis 10.

Considering this structure alone it will be appreciated that when the arm 11 is swung about the axis 10 the second arcuate member 14 will be caused to turn relatively thereto in identically the same manner as if the periphery of the arcuate member 14 were in rolling contact with the interior of a circle whose radius was equal to the radius of the arcuate member 12 which is twice that of the arcuate member 14. Consequently, as mathematically demonstrated in my copending application the point 18 will be caused to travel along the straight line A—B and the amounts of movement of the point will be commensurate with the amount of rotation or swing of the arm 11 about the axis 10.

This form of construction is somewhat advantageous in that the radius of the arcuate member 12 or stationary arcuate member need bear no relationship to the length of the arm 11 the length of the radius of arcuate member 12 need only be a fraction of the length of arm 11. Consequently, the radius of arcuate member 14 which is one-half that of arcuate member 12 may likewise be made relatively small. If the periphery of the second arcuate member 14 is in direct rolling contact with the interior of the arcuate periphery of the stationary arcuate member as disclosed in my copending application, the radius of curvature of the stationary arcuate member must be made equal to the distance between axes 10 and 17 plus the radius of arcuate member 14. As disclosed herein, however, it is merely necessary that the radius of arcuate member 14 be one-half of the radius of arcuate member 12 regardless of the lengths of the arms 11 and 16 and the function or result remains the same.

In addition to the structure already described, there is rigidly mounted at the outer end of the arm 11 concentric with the axis 17 a third arcuate member 19 and at the location 18 on the arm 16 there is rotatably mounted a fourth arcuate member 20. Arcuate members 19 and 20 are encircled by an endless belt, chain, or the equivalent indicated at 21, which engages the peripheries of these arcuate members without slippage. The radius of arcuate member 20 is twice that of the arcuate member 19.

As previously mentioned the point 18 on the arm 16 will be caused to traverse the straight line A—B in response to exciting movements imparted rotationally on the axis 10. However, if a stylus is mounted at the location 18, such a stylus would be caused to turn about its own axis in the course of its movement along the straight line A—B, such turning being equal to the turning movement of the arm 16 with respect to the line A—B. By means of the arcuate members 19 and 20 and the endless band 21, the arcuate member 20 can be held against turning relative to the arm 16 in the course of its movement along the line A—B. Consequently, any rigid structure mounted on the arcuate member 20 will not only be confined in its movement to a straight line represented by the line A—B, but will be held against rotation relative thereto despite the fact that arm 16 in the course of its movement, will turn relative to the line A—B. This construction may be advantageously employed to not only convert rotary motion into linear motion, but to connect the apparatus to the operative parts of conventional X—Y plotters.

From the above-described construction it will be appreciated that an improved mechanical movement has been developed for translating rotary motion into linear motion, or vice versa.

It will also be appreciated that in the abovedescribed construction, if the end of arm 16 is triggered or given the initial exciting movement in a linear direction that its movement will be translated into rotary movement of the shaft 10. The improved construction is highly advantageous in that the size of parts thereof may be quite independent of the lengths of the arms as long as the relative relationship between the parts is maintained.

Various changes may be made in the details of construction without departing from the spirit and scope of the invention as defined by the appended claims.

I claim:

1. Means for translating rotary motion into linear motion comprising a stationary arcuate member concentrically arranged with respect to the axis of rotary motion, a first arm swingable about the axis of rotary motion, a second arcuate member rotatably mounted on the arm whose radius of curvature is one-half of that of the first arcuate member, means for rotating the second arcuate member relative to the arm at a peripheral speed equal to that at which the arm traverses the periphery of the first arcuate member, a second arm rigid with the second arcuate member and swingable thereby about the axis of rotation of the second arcuate member relative to the first arm, a third arcuate member having an arcuate periphery concentrically arranged with respect to the axis of swing of the second arm relative to the first-mentioned arm and rigid with the first-mentioned arm, a fourth arcuate member rotatably mounted on the second arm, said fourth arcuate member having a radius of curvature twice that of the third arcuate member, and means for causing the third and fourth arcuate members to rotate at the same peripheral speed relative to each other.

2. Means for translating rotary motion into linear motion comprising a stationary arcuate member concentrically arranged with respect to the axis of rotary motion, a first arm swingable about the axis of rotary motion, a second arcuate member rotatably mounted on the arm whose radius of curvature is one-half of that of the first arcuate member, means for rotating the second arcuate member relative to the arm at a peripheral speed equal to that at which the arm traverses the periphery of the first arcuate member, a second arm rigid with the second arcuate member and swingable thereby about the axis of rotation of the second arcuate member relative to the first arm, a third arcuate member having an arcuate periphery concentrically arranged with respect to the axis of swing of the second arm relative to the first-mentioned arm and rigid with the first-mentioned arm, a fourth arcuate member rotatably mounted on the second arm for rotation about an axis spaced from the axis of rotation of the second arcuate member relative to the first-mentioned arm that the axis of rotation of the second arcuate member relative to the first-mentioned arm is spaced from the first-mentioned axis of rotation, said fourth arcuate member having a radius of curvature twice that of the third arcuate member, and means for causing the third and fourth arcuate members to rotate at the same peripheral speed relative to each other.

References Cited in the file of this patent

UNITED STATES PATENTS

| 952,383 | Tomer | Mar. 15, 1910 |
| 1,623,348 | Kiefer | Apr. 5, 1927 |
| 1,712,927 | Martois | May 14, 1929 |
| 1,897,140 | Perez | Feb. 14, 1933 |
| 2,783,385 | Wytzes | Feb. 26, 1957 |

FOREIGN PATENTS

| 486,889 | Germany | Nov. 27, 1929 |
| 511,945 | France | Oct. 2, 1920 |